(12) United States Patent
Kendall et al.

(10) Patent No.: US 8,057,609 B2
(45) Date of Patent: Nov. 15, 2011

(54) PORTABLE FUEL CELL DEVICE

(75) Inventors: Kevin Kendall, Market Drayton (GB); Michaela Kendall, Market Drayton (GB)

(73) Assignee: Adelan Limited, Market Drayton (GB)

( * ) Notice: Subject to any disclaimer, the term of this patent is extended or adjusted under 35 U.S.C. 154(b) by 1230 days.

(21) Appl. No.: 11/598,593

(22) Filed: Nov. 13, 2006

(65) Prior Publication Data

US 2007/0059572 A1  Mar. 15, 2007

(51) Int. Cl.
*C06B 45/00* (2006.01)
*D03D 23/00* (2006.01)
*D03D 43/00* (2006.01)

(52) U.S. Cl. ..... 149/2; 149/108.4; 149/109.2; 149/109.4

(58) Field of Classification Search ........... 149/2, 108.4, 149/109.2, 109.4
See application file for complete search history.

(56) References Cited

U.S. PATENT DOCUMENTS

| 5,827,620 | A | 10/1998 | Kendall | 429/31 |
| 5,874,183 | A | 2/1999 | Uematsu | 429/34 |
| 5,993,985 | A * | 11/1999 | Borglum | 429/484 |
| 6,042,956 | A | 3/2000 | Lenel | 429/17 |
| 6,696,187 | B2 * | 2/2004 | Kendall et al. | 429/436 |
| 2002/0081472 | A1 | 6/2002 | Kendall et al. | 429/26 |
| 2003/0003346 | A1 * | 1/2003 | Bronoel | 429/40 |
| 2003/0165727 | A1 | 9/2003 | Priestnall et al. | 429/34 |
| 2003/0215683 | A1 * | 11/2003 | Bruck et al. | 429/26 |
| 2004/0067400 | A1 | 4/2004 | Steinfort | 429/26 |
| 2004/0209130 | A1 * | 10/2004 | Lifshits | 429/13 |
| 2004/0258970 | A1 * | 12/2004 | McLean | 429/26 |

FOREIGN PATENT DOCUMENTS

| DE | 10056536 A1 | 6/2002 |
| WO | WO 0173880 | 10/2001 |
| WO | WO 0173881 | 10/2001 |

OTHER PUBLICATIONS

W. Van Gool, *Phillips Res. Repts 20* (1965) pp. 81-93.
T Hibino et al., *Science 288* (2000) pp. 2031-2033.
K. Asano & H. Iwahara, *J Electochem Soc.* 144 (1997) pp. 3125-3130.
T. Hibino et al., *J Electochem Soc.* 149 (2002) pp. A133-A136.
I. Riess et al., *Solid Sate Ionics 82* (1995) pp. 1-4.

* cited by examiner

*Primary Examiner* — James McDonough
(74) *Attorney, Agent, or Firm* — Sam K. Tahmassebi; TechLaw LLP

(57) ABSTRACT

A fuel cell device comprising: (a) a catalytic oxidizer; (b) means for delivering gaseous fuel and oxidizer to the catalytic oxidizer; and (c) a fuel cell assembly located in the vicinity of the catalytic oxidizer such that the fuel cell assembly is able to be heated by heat generated from the reaction of fuel and oxidizer at the catalytic oxidizer; wherein the fuel cell assembly causes the generation of hot gases and an electrical output when it is heated and supplied with fuel and oxidizer, and wherein the device is provided with (d) a heat outlet which allows hot gases generated by the device to be directed out of the device and to applications requiring heat. Also provided is the use of such a device to generate heat and/or electrical power, and an appliance comprising such a device.

37 Claims, 1 Drawing Sheet

PORTABLE FUEL CELL DEVICE

Figure 1:
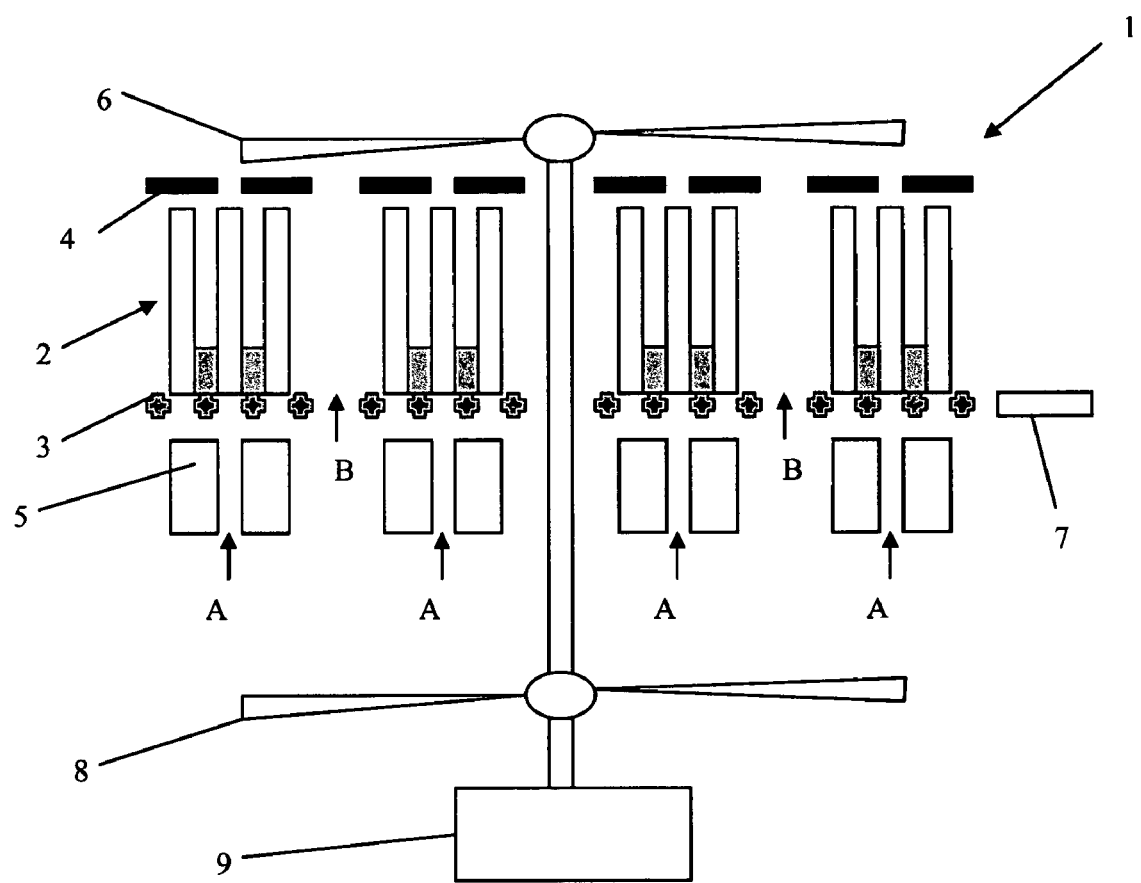

The present invention relates to portable fuel cell devices and their uses.

Many portable devices exist which require the generation of heat in order to perform their desired function, for example hair dryers, hair curlers, hair straighteners, portable heaters, and nail varnish dryers. Traditionally, such devices are battery powered, or, if portable batteries are unable to supply an appropriate level of power, these devices require a mains supply of power. Clearly if mains power is required then the devices are not truly portable in the sense that they cannot be used anywhere but rather can only be used in locations where mains power is available. Meanwhile, if batteries are used then there is the associated disadvantage that batteries require regular replacement.

Solid oxide fuel cells (SOFCs) have largely been developed for stationary power applications, with power outputs in the 200 kWe to MWe range, based on 20 mm diameter ceramic tubes or 10×10 cm square plates stacked with mm gaps between the cells. Such cells require a long time for start-up, from 1 to 7 hours, in order to avoid problems due to thermal shock, making such cells inapplicable in portable applications.

Accordingly, it would be desirable to have a device that is portable and is also suitable for replacing batteries or mains power as a power source for products that are required to generate heat.

According to a first aspect of the present invention, there is provided a fuel cell device comprising a catalytic oxidiser, means for delivering gaseous fuel and oxidiser to the catalytic oxidiser, and a fuel cell assembly located in the vicinity of the catalytic oxidiser such that the fuel cell assembly is able to be heated by heat generated from the reaction of fuel and oxidiser at the catalytic oxidiser, wherein the fuel cell assembly causes the generation of hot gases and an electrical output when it is heated and supplied with fuel and oxidiser, and wherein the device is provided with a heat outlet which allows hot gases generated by the device to be directed out of the device and to applications requiring heat.

Preferably, the heat outlet is located so that it allows the direction of some of the heat generated from the reaction of fuel and oxidiser at the catalytic oxidiser out of the device and to applications requiring heat. This is advantageous because heat can then begin to be supplied to applications requiring heat within a very short time period after the fuel and oxidiser have initially been supplied to the device.

The device suitably comprises heat directing means that act to direct the hot gases flowing out from the heat outlet to desired applications; this clearly assists in the efficiency of transfer of heat to desired applications. In particular, the heat directing means may comprise a fan, preferably an electric fan.

The fan may suitably be electrically connected to the fuel cell assembly so that, in use, it is powered by electric current generated by the fuel cell assembly electric current generated by the fuel cell assembly. Alternatively or additionally, the fan may suitably be electrically connected to the fuel cell assembly so that, in use, it feeds current back when driven by hot gas.

For example, the device may comprise an electric motor that is connected to the fuel cell assembly such that it can be powered by electric current generated by the fuel cell assembly, with this electric motor also being connected to the fan so that it can drive the fan. Accordingly, once the fuel cell assembly has warmed up and begun to deliver power, the fan can start to direct hot gases towards the intended application. The fan may also act to draw air through the device.

In one embodiment, the electric motor may be such that it can act as a generator in certain circumstances, thereby enabling more electrical output to be provided from the device.

The heat directing means may alternatively or additionally comprise a funnel leading from the heat outlet towards the desired applications.

It is preferred that the catalytic oxidiser and fuel cell assembly are arranged relative to each other such that gases that emerge from the catalytic oxidiser can flow freely to and around the fuel cell assembly. In particular, the catalytic oxidiser and fuel cell assembly may be arranged relative to each other such that gases that emerge from the catalytic oxidiser can flow around the outer surfaces of the fuel cell assembly as well as through the fuel cell assembly.

Preferably, therefore, there is no sealing arrangement between the catalytic oxidiser and the fuel cell assembly that channels the gases emerging from the catalytic oxidiser through the fuel cell assembly only, blocking the path for such gases to flow around the fuel cell assembly, as is commonly found in conventional designs. In such conventional designs the gases firstly flow through the fuel cell assembly only, before then flowing back around the fuel cell assembly.

The benefit of such an arrangement is that more rapid start up times are achieved, as the hot gases that emerge from the catalytic oxidiser go directly to heat both the outer surfaces and the interior of the fuel cell assembly. Therefore once hot gases start emerging from the catalytic oxidiser, the assembly is both heated from within and without, and so can reach operating temperature quickly, even when some of the hot gases that emerge from the catalytic oxidiser are directed via the heat outlet out of the device and to applications requiring heat. This is significant for the device of the present invention because for a fuel cell to be truly portable rapid start up times are needed.

Further, there is the advantage of avoiding the need for a complex sealed design, giving a simpler and cheaper to produce product. In addition, the problems with seal cracking encountered by fuel cell devices having sealing are clearly avoided by not having a seal present.

The means for delivering gaseous fuel and oxidiser to the catalytic oxidiser may be any suitable means but preferably comprises one or more injectors or jets. Any such injectors or jets are suitably such that they can spray fuel or a mixture of fuel and oxidiser through the catalytic oxidiser, for example through the catalytic oxidiser to reach an anode component of the fuel cells.

The device may be provided with means for mixing fuel and oxidiser prior to reaching the catalytic oxidiser, so that the fuel and oxidiser do not have to be provided to the device in mixed form. A chamber having a fuel inlet and an oxidiser inlet may be provided in this respect, in which fuel and oxidiser can be mixed; this chamber preferably leads directly to the catalytic oxidiser so that the mixed fuel and oxidiser can pass straight to the catalytic oxidiser from the chamber.

In one embodiment, the oxidant is air and therefore preferably an air inlet hole that allows air to be provided from the environment to the chamber is provided. It is further preferred that one or more fuel injectors or jets are provided in the chamber. The air and fuel gas may then be mixed in the chamber prior to reaching the catalytic oxidiser.

The device may suitably comprise means for delivering gaseous oxidiser to the fuel cell assembly. Preferably, the device is provided with one or more gas inlet holes that allow gaseous oxidiser to be provided to the fuel cell assembly, more preferably one or more air inlet holes that allow air to be provided from the environment to the fuel cell assembly. In a preferred embodiment, the device is provided with one or more air inlet holes, for example two or more air inlet holes, located such that the or each hole allows air to be provided to the end of the fuel cell assembly closest to the catalytic oxidiser.

The device is preferably provided with means to draw air from the environment into the chamber. As mentioned above, a fan may be included which may act to draw air though the device. The device may, alternatively or additionally, be provided with one or more fuel injectors or jets arranged such that the fuel stream injected from the or each injector or jet into the chamber acts to draw air from the environment into the chamber. Alternatively or additionally, a compressor may be provided that draws air into the chamber. The compressor may suitably be attached to a fan as described above. Thus hot air can be both pushed through and drawn out of the device.

The heat outlet may be located in or near to the region between the catalytic oxidiser and the fuel cell assembly. This allows hot gases produced at the catalytic oxidiser to be directed via the heat outlet to applications requiring heat. This also allows hot gases produced at the fuel cell assembly to be directed via the heat outlet to applications requiring heat.

In one embodiment, the device is provided with one or more multi-purpose holes, with the or each hole serving both as an air inlet hole that allows air to be provided from the environment to the fuel cell assembly and as the heat outlet that allows hot gases generated by the device, for example hot gases generated at the catalytic oxidiser, to be directed out of the device and to applications requiring heat. Preferably, any such multi-purpose holes are located in or near to the region between the catalytic oxidiser and the fuel cell assembly, so that both hot gases produced at the catalytic oxidiser and hot gases produced at the fuel cell assembly can be directed via these holes to applications requiring heat.

In one embodiment the device is provided with one or more multi-purpose holes, which serve both as an air inlet hole and as a heat outlet and is provided with a fan located near to the or each hole, such that the fan can act to direct the hot gases exiting via the heat outlet to desired applications and to draw air from outside the device into the device and to the fuel cell assembly.

The device may optionally be provided with heat insulation; for example some, most or substantially all of the fuel cell assembly may be provided with thermal insulation. For example, a layer of heat insulating material may be placed around some, most or substantially all of the length of the fuel cell assembly.

In one embodiment there is substantially no heat insulation around the region between the catalytic oxidiser and the fuel cell assembly, and there may be substantially no heat insulation around the end of the fuel cell assembly closest to the catalytic oxidiser. In particular this allows some of the heat generated by the reaction of fuel and oxidiser at the catalytic oxidiser to be effectively channeled out of the device and to applications requiring heat.

The fuel cell device may be supplied with fuel from any suitable source, in particular those known in the art for supplying fuel to fuel cells, for example a bottle or other container of liquid or gaseous fuel.

The fuel cell assembly may suitably comprise one or more ceramic tubes, for example the fuel cell assembly may comprise two or three ceramic tubes. If more than one ceramic tube is present, these tubes may suitably be arranged in parallel. The tubes may suitably be of the form standardly known in the art for use in fuel cells. The ceramic may be zirconium oxide, ceria, gadolinia, or other oxide materials, and may be doped with a dopant such as yttria, scandia, magnesia or calcia. The preferred ceramic is zirconium oxide, doped with yttria, as this provides good ionic conductivity.

In a preferred embodiment, the fuel cell assembly comprises one or more fuel cell bundles, such as three or more fuel cell bundles; the fuel cell bundles may, for example, be microtube fuel cell bundles. The fuel cell bundles suitably comprise three or more fuel cell tubes, such as the ceramic tubes described above; preferably the fuel cell bundles comprise five or more fuel cell tubes, more preferably ten or more fuel cell tubes, for example fifteen to twenty fuel cell tubes. Typically, the bundle may contain 19 tubes.

The number of fuel cell bundles in the fuel cell assembly may be chosen in view of the intended application. If the device is to be used in an application requiring low power/heat output, for example in a small appliance such as a nail varnish drier, then the number of bundles may be in the region of 1 to 20. If the device is to be used in an application requiring medium power/heat output, for example in a medium sized appliance such as a leisure heater, then the number of bundles may be in the region of 20 to 200. If the device is to be used in an application requiring high power/heat output, for example in a large appliance such as an auxiliary power and heater unit or a central heating power supply unit, then the number of bundles may be up to 10000.

The fuel cell bundles are suitably connected together by an interconnecting component, for example an interconnecting mesh. This component serves to hold each bundle in the required location within the device. The interconnecting component may also suitably be such that it collects the electrical power output generated by the fuel cell bundles. Accordingly, the interconnecting component may suitably be connected to a power output component that acts to transfer the electrical power output generated to the desired application.

The fuel cell assembly may be provided with any suitable anode and cathode connections and current collector structures in order to allow the electrical current generated by the fuel cell assembly to flow to electrical devices; for example the anode and cathode connections and current collector structures described in WO94/22178 may be used. The electrodes may be platinum, nickel, alloys of platinum with other metals, gold alloys, silver alloys, or stainless steel alloys, e.g. ferritic stainless steel. The cathode surfaces may be made of, or coated with, perovskites such as lanthanum strontium manganite; in particular such materials may be selected to improve performance. Lanthanum strontium chromite or other stable oxides may be coated on electrode and interconnect surfaces to improve performance.

The catalytic oxidiser may be a mesh, preferably a metal mesh, coated with or impregnated with a catalyst, such as platinum on ceramic. Alternatively, the catalytic oxidiser may be formed from a porous mass of ceramic fibres supporting a catalyst such as a platinum catalyst. For example the catalytic oxidiser may be high surface area saffil alumina fibre loaded with 5% by weight of platinum deposited from chloroplatinic acid.

Suitably the catalytic oxidiser is one that supports reaction without a flame, as this leads to low emission levels.

A filter may be provided between the entry for the fuel into the device and the catalytic oxidiser, in particular a filter may be provided between the entry for the fuel into the device and the fuel injector. Preferably, the filter is a filter capable of absorbing sulphur. For example, glass fibre incorporating a pellet capable of absorbing sulphur could be used, such as glass fibre incorporating a molybdenum pellet.

A valve may also be provided in the device, to control the supply of fuel from the fuel source. The valve may suitably be located between the entry for the fuel into the device and the fuel injector, for example between the entry for the fuel into the device and the filter.

The device may further comprise an ignition system, for example the device may further comprise a piezoelectric ignition system. This system is located in the device so as to allow easy ignition of the mixture of fuel and oxidiser before it reaches the catalytic oxidiser, thus allowing easy start-up of the device.

In use, a gaseous mixture of fuel and oxidiser is supplied to the catalytic oxidiser, where ignition occurs and the fuel and oxidiser react. This causes the catalytic oxidiser to be heated, and accordingly the gas passing through it and the fuel cell assembly are also heated. Heated gas passes from the catalytic oxidiser both into the fuel cell assembly and into the region around the fuel cell assembly; this causes the fuel cell assembly to heat up rapidly and therefore reach operating temperature quickly. The fuel concentration in the centre of the gas stream, reaching the centre of fuel cell assembly, is higher than in the periphery of the gas stream and so a concentration gradient is caused across the fuel cell assembly, thereby creating a voltage. The fuel cell assembly also causes the generation of hot gases when it is heated and supplied with fuel and oxidiser. At least some of the hot gases generated at the catalytic oxidiser and/or the hot gases generated at the fuel cell assembly are directed out of the device and to applications requiring heat via the heat outlet.

Preferably, some of the hot gases generated at the catalytic oxidiser are directed out of the device and to applications requiring heat via the heat outlet whilst the remainder of these gases pass from the catalytic oxidiser into the fuel cell assembly and into the region around the fuel cell assembly. Preferably, the hot gases generated at the fuel cell assembly are directed out of the device and to applications requiring heat via the heat outlet.

The fuel for use in the device may be any suitable fuel; those known in the art for use in fuel cells may particularly be mentioned, such as butane, hydrogen, methane, natural gas, biogas, propane and liquid hydrocarbons.

The oxidiser supplied to the catalytic oxidiser and any oxidiser supplied to the fuel cell assembly may each be any suitable oxidiser and they may be the same or different. Oxidisers known in the art for use in fuel cells may particularly be mentioned; in particular oxygen in pure form, substantially pure form or in the form of a mixture with other gases, for example air, may be used. The preferred oxidiser is air.

The present invention also provides, in a second aspect, the use of a fuel cell device in accordance with the first aspect to generate heat. Preferably, the device is used to generate hot gas, for example hot air. The fuel cell device may suitably be used to generate heat that is used for drying; in particular, the fuel cell device may be used to generate heat that is used to dry wet products, for example to dry nail varnish, wet hair, wet hands or paint. The fuel cell device may also be used to generate heat for other applications that require heat, for example for use in cooking, hair straightening, and hair curling, as well as for heating a space, such as a room or some or all of a building.

In particular the embodiment described above whereby the fuel cell device further comprises a fan, for example an electric fan, may suitably be utilised in the above uses.

Also provided, in a third aspect, is the use of a fuel cell device in accordance with the first aspect to generate electrical power. In particular, the fuel cell device may be used to generate electrical power for powering systems, for example for powering lights, control systems, computers, communication systems, radios, hair straighteners, hair curlers or clocks; or the fuel cell device may be used to generate electrical power that is used for heating or drying, for example for drying nail varnish, wet hair, wet hands or paint, for cooking, for hair straightening or for hair curling.

In one embodiment, the device of the present invention used in this way comprises a fan and an electric motor/generator, as discussed above. The electrical power generated by the device may, in this case, be partly provided by the fuel cell assembly and partly by the fan driving the electric motor/generator.

Alternatively, the electrical power generated by the device may be solely provided by the fuel cell assembly.

The device in accordance with the first aspect of the invention may suitably be used both to generate heat and to generate electricity. For example, the device may be used to generate heat for drying and/or heating, whilst also being used to generate electricity for powering an electric fan for directing the heat to the required location and/or for powering a clock or timer that allows the length of time that the heat is applied for to be monitored.

The present invention also provides, in a fourth aspect, an appliance comprising a fuel cell device in accordance with the first aspect of the invention. In particular, a heat generating appliance is provided, such as a hair dryer, hair curler, hair straighteners, nail varnish dryer, portable heater, or hand dryer, that comprises a fuel cell device in accordance with the first aspect. Preferably a portable heat generating appliance comprising a fuel cell device in accordance with the first aspect of the invention is provided, that may suitably be used when travelling at home or abroad and in particular when camping or caravanning or the like. The embodiment described above whereby the fuel cell device further comprises a fan, for example an electric fan, may suitably be comprised in the heat generating appliances.

Preferably, the heat generating appliance has some, most, substantially all, or all of its heat generating requirements fulfilled by the heat generated by the fuel cell device. Additional heat may be generated using the electrical power generated by the fuel cell device, and/or other functions of the appliance may be powered by the electrical power generated by the fuel cell device, for example an electric fan or a clock or timer may be powered by the electrical power generated by the fuel cell device.

The present invention will now be further described, by means of example only, with reference to the accompanying drawing in which:

FIG. 1 is a schematic representation of a fuel cell device according to the present invention, which illustrates the principle of the invention.

FIG. 1 schematically illustrates the principle of the fuel cell device of the invention. The device 1 shown in FIG. 1 includes a fuel cell assembly 2 comprising a number of fuel cell bundles. A catalytic oxidiser 3, which is a wire mesh impregnated with catalyst, is located close to the fuel cell assembly 2, at one end of the fuel cell assembly 2. An interconnect mesh 4 is located at the other end of the fuel cell assembly 2, which mesh 4 connects each of the fuel cell bundles, holding them in the required position and collecting the electrical power output generated by the fuel cells.

The device also comprises a set of injector jets 5, located on the same side of the fuel cell assembly 2 as the catalytic oxidiser 3, which can spray fuel towards the catalytic oxidiser 3. The device further comprises a fan 6, located on the same side of the fuel cell assembly 2 as the interconnect mesh 4, which can direct hot gases out of the device towards desired applications.

A spark ignitor system 7 is also provided, close to the catalytic oxidiser 3. The device also includes a compressor 8, which is located on the same side of the fuel cell assembly 2 as the injector jets 5 and is connected to the fan 6. The compressor 8 can act to draw air towards fuel cell assembly 2, via the catalytic oxidiser 3, from an inlet (not shown).

An electric motor 9 is also provided. This motor 9 is connected to the fan 6 and to the compressor 8 such that it can power these components. The motor 9 is adapted so that it can be driven by the electrical output of the fuel cell assembly 2.

Under certain circumstances, the electric motor 9 can act as a generator to provide even more electrical output from the device.

Accordingly, in use, fuel (shown by arrow A) is supplied to the injector jets 5, through which the fuel passes and is sprayed towards the catalytic oxidiser 3. An air supply (shown by arrow B) is also drawn into the device by the compressor 8 and the fuel jets 5 to impinge on the catalytic oxidiser 3.

The fuel and air is ignited at the catalytic oxidiser 3 by the spark ignitor system 7. This ignited fuel/air gas stream heats the catalytic oxidiser 3 until it is red hot, at which point it supports the reaction of the fuel and air without a flame.

The hot gas stream passes from the catalytic oxidiser 3 to the fuel cell assembly 2. The fuel concentration will be higher in the centre of the gas stream than in the periphery of the gas stream and so a concentration gradient will develop across the bundles making up fuel cell assembly 2, thereby creating a voltage. The interconnect mesh 4 can collect the electrical power generated and transfer it to the required application. Electrical power generated also powers the electric motor 9, which drives the fan 6 and the compressor 8.

The hot gas stream can exit the device via heat outlets (not shown) and be directed to the desired application by the fan 6.

EXAMPLE

A device in accordance with a specific embodiment of the invention was built from three microtubular fuel cells. The fuel cells were 50 mm long and 2 mm diameter, made from yttria stabilised zirconia electrolyte and coated with a two layer nickel cermet anode and a two layer lanthanum strontium manganite cathode. The materials used were as described in High Temperature Solid Oxide Fuel Cells (eds Singhal and Kendall), Elsevier, Oxford 2003 chapter 8.

The bundle of three cells was positioned between a catalytic metal mesh and a stainless steel interconnect mesh, without any sealing. This assembly was then enclosed in a steel tube with thermal insulation partly covering the inner wall.

The device was provided with a fuel inlet to receive fuel from a fuel container and a control valve to control the supply of fuel into the device. The inlet and valve were arranged such that the fuel stream entering into the device through the inlet and valve creates a venturi effect and thus acts to draw air from the environment into the device. The inlet and valve were located such that they permitted a jet of fuel to be sprayed through the catalytic mesh and onto the fuel cell anode.

A piezoelectric ignition device was also provided, located close to the catalytic mesh, between the control valve and the catalytic mesh. A heat outlet hole was included in the steel tube enclosure to allow the heat generated by the device to be directed to useful applications.

In a test of the operation of the described device, a butane canister was used to provide butane as fuel to the device. The butane was fed through the inlet and control valve to create a venturi, which sucked in air. The jet of gas impinged on the catalytic mesh and was ignited with a spark generated by the piezoelectric ignition device. The reacting hot gas impinged on the fuel cell bundle and warmed it rapidly.

Within one minute the fuel cells were providing power to an electric fan connected to the fuel cell assembly, with the fan being located near the heat outlet hole so that the fan could act to direct the hot gases from the device to useful applications. For example, nail varnish was coated onto fingernails and these were held for one minute in the hot air stream emitted from the fuel cell device, after which time the nail varnish was dry.

Surprisingly, it was found that the device could be switched on and off many times without destroying the sensitive nickel anodes.

The invention claimed is:

1. A portable fuel cell device used to provide heat to an external application requiring heat, the device comprising:
   a catalytic oxidizer;
   means for delivering gaseous fuel and oxidizer to the catalytic oxidizer; and
   a fuel cell assembly comprising ceramic tubes provided in the form of microtube fuel cell bundles, the fuel cell assembly being located in the vicinity of the catalytic oxidizer such that the fuel cell assembly is able to be heated by heat generated from the reaction of fuel and oxidizer at the catalytic oxidizer;
   wherein the fuel cell assembly causes the generation of hot gases and an electrical output when it is heated and supplied with fuel and oxidizer; and
   wherein the device is provided with a heat outlet which allows hot gases generated by the device to be directed out of the device and to the external application requiring heat; and
   wherein the device comprises heat directing means that act to direct the hot gases flowing out from the heat outlet to the external application requiring heat.

2. A device according to claim 1, wherein the heat outlet is located so that it allows the direction of some of the heat generated from the reaction of fuel and oxidizer at the catalytic oxidizer out of the device and to the external application requiring heat.

3. A device according to claim 1 wherein the heat directing means comprises a fan.

4. A device according to claim 3 wherein the fan is electrically connected to the fuel cell assembly so that, in use, it is powered by electric current generated by the fuel cell assembly, and/or so that, in use, it feeds current back when driven by hot gas.

5. A device according to claim 4 wherein the device comprises an electric motor that is connected to the fuel cell assembly such that it can be powered by electric current generated by the fuel cell assembly, with this electric motor also being connected to the fan so that it can drive the fan.

6. A device according to claim 1 wherein the heat directing means comprises a funnel leading from the heat outlet towards the external application requiring heat.

7. A device according to claim 1 wherein the catalytic oxidizer and fuel cell assembly are arranged relative to each other such that gases that emerge from the catalytic oxidizer can flow freely to and around the fuel cell assembly.

8. A device according to claim 7 wherein there is no sealing arrangement between the catalytic oxidizer and the fuel cell assembly that channels the gases emerging from the catalytic oxidizer through the fuel cell assembly only, blocking the path for such gases to flow around the fuel cell assembly.

9. A device according to claim 1 wherein the means for delivering gaseous fuel and oxidizer to the catalytic oxidizer comprises one or more injectors or jets.

10. A device according to claim 1 wherein the device is provided with means for mixing fuel and oxidizer prior to reaching the catalytic oxidizer.

11. A device according to claim 10 wherein a chamber having a fuel inlet and an oxidizer inlet is provided, in which fuel and oxidizer can be mixed.

12. A device according to claim 11 wherein the chamber leads directly to the catalytic oxidizer so that the mixed fuel and oxidizer can pass straight to the catalytic oxidizer from the chamber.

13. A device according to claim 1 wherein the oxidant is air and an air inlet hole that allows air to be provided from the environment to the chamber is provided.

14. A device according to claim 13 wherein one or more fuel injector or jet is provided in the chamber.

15. A device according to claim 1 wherein the device comprises means for delivering gaseous oxidizer to the fuel cell assembly.

16. A device according to claim 15 wherein the device is provided with one or more air inlet hole(s) that allows air to be provided from the environment to the fuel cell assembly.

17. A device according to claim 16 wherein the device is provided with one or more air inlet hole(s) located such that the or each hole allows air to be provided to the end of the fuel cell assembly closest to the catalytic oxidizer.

18. A device according to claim 1 wherein means are provided to draw air from the environment into the chamber.

19. A device according to claim 18 wherein the device comprises one or more fuel injectors or jets arranged such that the fuel stream injected from the or each injector or jet into the chamber acts to draw air from the environment into the chamber.

20. A device according to claim 18 wherein a compressor is provided that draws air into the chamber.

21. A device according to claim 1 wherein the heat outlet is located in or near to the region between the catalytic oxidizer and the fuel cell assembly.

22. A device according to claim 1 wherein the device is provided with one or more multi-purpose hole, with the hole serving both as an air inlet hole that allows air to be provided from the environment to the fuel cell assembly and as the heat outlet that allows hot gases generated by the device to be directed out of the device and to the external application requiring heat.

23. A device according to claim 22, wherein the multi-purpose hole is located in or near to the region between the catalytic oxidizer and the fuel cell assembly.

24. A device according to claim 22, wherein the device is provided with a fan located near to the multi purpose hole, such that the fan can act to direct the hot gases exiting via the heat outlet to the external application requiring heat and to draw air from outside the device into the device and to the fuel cell assembly.

25. A device according to claim 1 wherein there is substantially no heat insulation around the region between the catalytic oxidizer and the fuel cell assembly.

26. A device according to claim 1 wherein there is substantially no heat insulation around the end of the fuel cell assembly closest to the catalytic oxidizer.

27. A device according to claim 1 wherein the fuel cell assembly comprises more than one ceramic tube, with these tubes being arranged in parallel.

28. A device according to claim 1 wherein the ceramic is zirconium oxide, ceria, gadolinia, or other oxide material, optionally doped with a dopant.

29. A device according to claim 1 wherein the fuel cell bundle comprises three or more fuel cell tubes.

30. A device according to claim 29 wherein the fuel cell bundle comprises ten or more fuel cell tubes.

31. A device according to claim 1 wherein the catalytic oxidizer is a mesh or is formed from a porous mass of ceramic fibres supporting a catalyst.

32. A device according to claim 1 wherein a filter is provided between the entry for the fuel into the device and the catalytic oxidizer.

33. A device according to claim 32 wherein a filter is provided between the entry for the fuel into the device and the fuel injector.

34. A device according to claim 32 wherein the filter is a filter capable of absorbing sulphur.

35. A device according to claim 1 wherein a valve is provided in the device, to control the supply of fuel from the fuel source.

36. A device according to claim 1 wherein the device comprises an ignition system.

37. A device according to claim 28 wherein the dopant is selected from yttria, scandia, magnesia or calcia.

* * * * *